Figure 6:
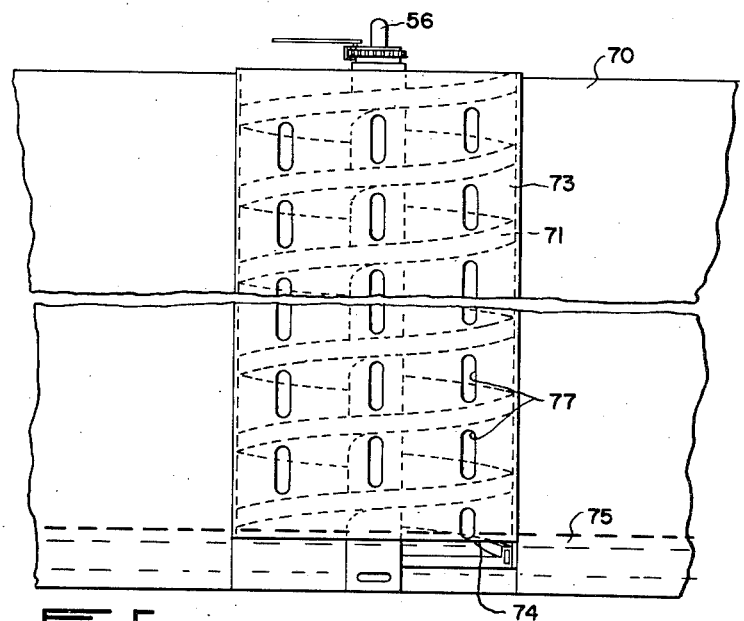

June 12, 1962  A. N. HULTMAN  3,038,314
SPIRAL FISH LADDER
Filed Nov. 7, 1958  3 Sheets-Sheet 1
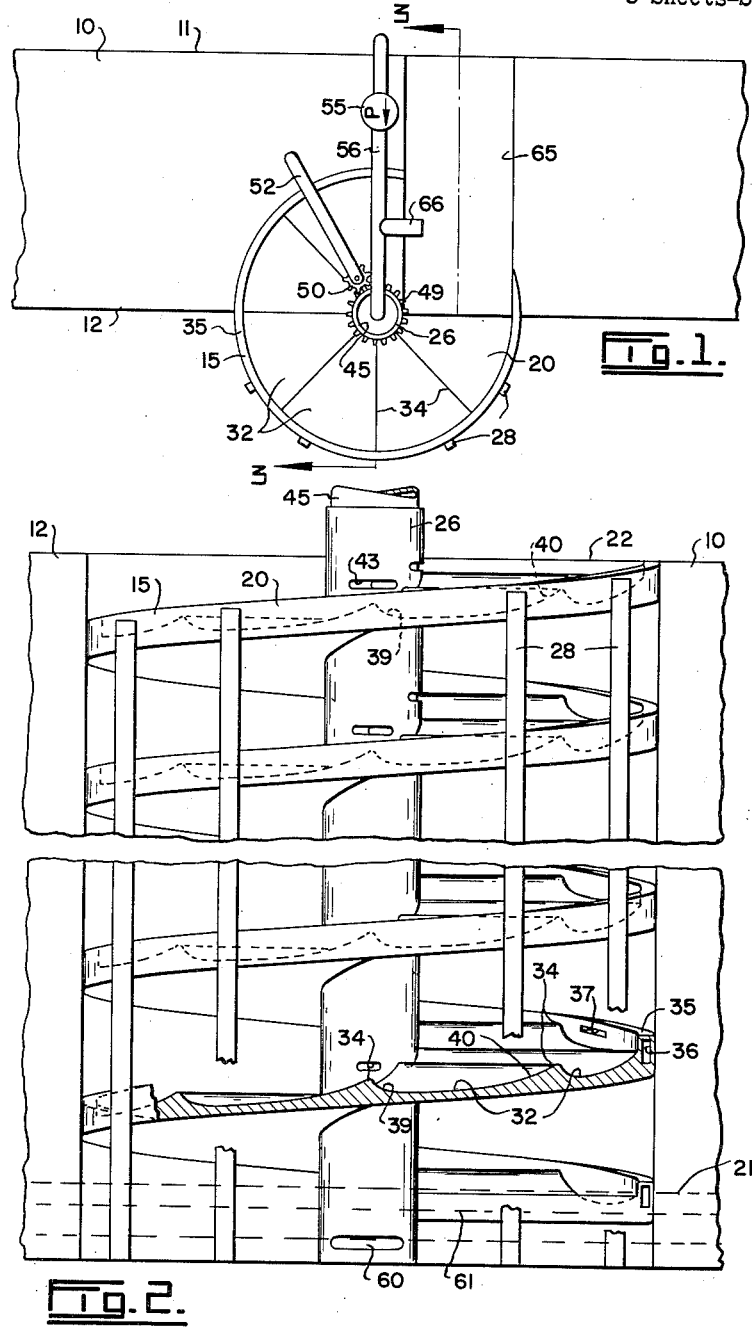
INVENTOR
ANDREW NORMAN HULTMAN
BY
Fetherstonhaugh & Co.
ATTORNEYS June 12, 1962     A. N. HULTMAN     3,038,314
SPIRAL FISH LADDER
Filed Nov. 7, 1958     3 Sheets-Sheet 2
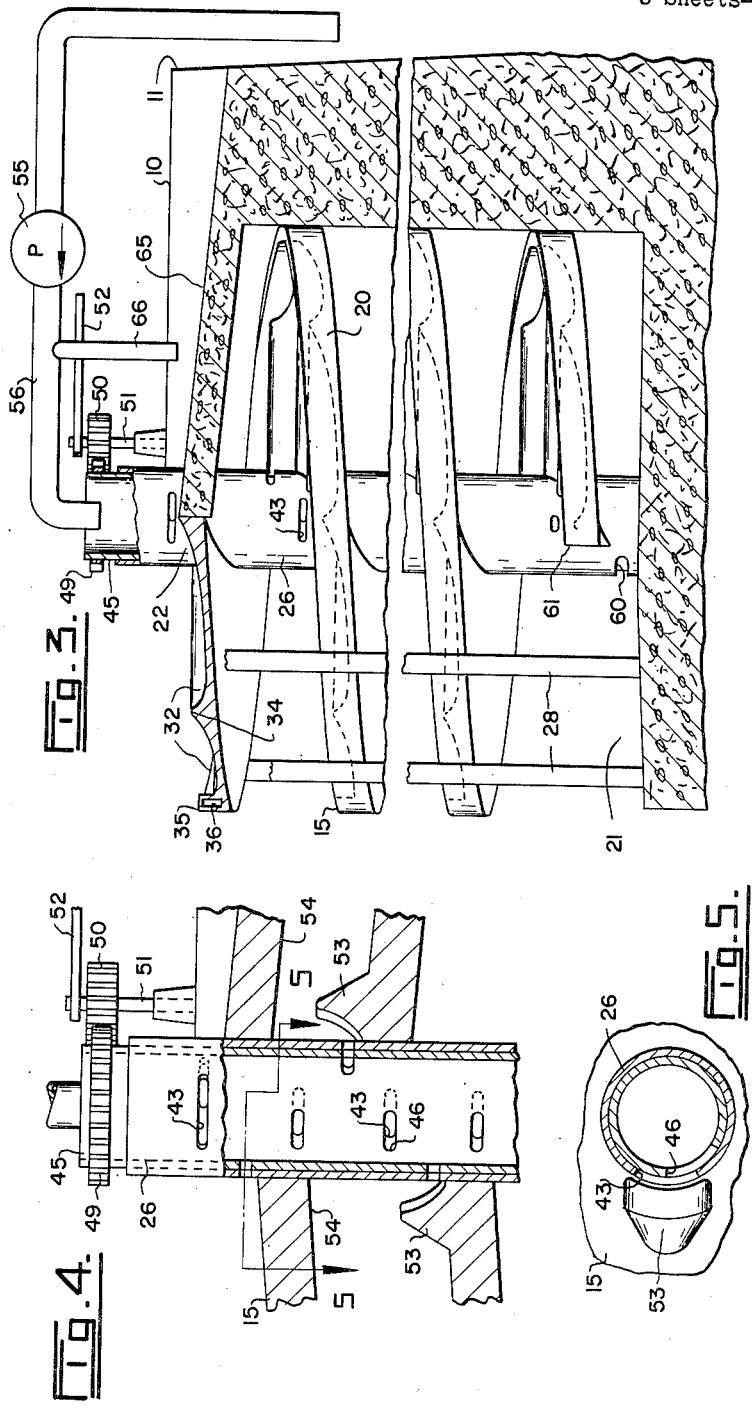
INVENTOR
ANDREW NORMAN HULTMAN
BY
Fetherstonhaugh & Co.
ATTORNEYS June 12, 1962 A. N. HULTMAN 3,038,314
SPIRAL FISH LADDER
Filed Nov. 7, 1958 3 Sheets-Sheet 3

INVENTOR
ANDREW NORMAN HULTMAN
BY
Featherstonhaugh & Co.
ATTORNEYS

United States Patent Office 3,038,314
Patented June 12, 1962

3,038,314
SPIRAL FISH LADDER
Andrew Norman Hultman, 1107 E. 41st Ave., Vancouver, British Columbia, Canada
Filed Nov. 7, 1958, Ser. No. 772,617
2 Claims. (Cl. 61—21)

This invention relates to a ladder for assisting fish to move from low water to high water at dams or other obstructions in streams.

It is well known that salmon as spawning time approaches return to the streams in which they were hatched. These fish swim up the streams to spawn. Many of these streams have dams across them for water power, or they may have other obstructions in them, which prevent the fish from swimming back to the spawning grounds. Many attempts have been made to get the fish to the water above the dams or obstructions, but these have not been too successful, and there is a fear that if many more streams or rivers are dammed, the salmon fishing industry will suffer.

In some places, fish ladders have been provided around dams. These are somewhat like flumes extending from below the dam to a point above it, these flumes being divided into a series of pools or pockets. The fish swim in the pockets and leap from one to the other until they reach the top of the ladder. The difficulty with these is that they can be used only in places where there is sufficient room at one end of the dam and both above and below it for the construction of the ladder. Furthermore, it is not practical to raise a fish very high with a ladder of that type. At some dams, the fish are guided into pools from which they are bailed out and placed in tank trucks to be driven to the higher waters above the dams.

The present spiral ladder is such that it may be completely built in a dam, or partially built therein, or it may be constructed as a separate unit at the lower face of the dam. Thus, no ground is required around the end of the dam or above and below it. Fish may be raised by this spiral ladder to any reasonable height, and this ladder has the advantage that it may be constructed and used at dams that are already erected.

A ladder according to the present invention for assisting fish to move from low water to higher water at dams and obstructions in streams, comprising a spiral way extending upwardly from within the low water to the height it is desired to raise fish for the higher water, said way forming a gently sloping passage to the desired height, a succession of shallow and progressively higher pockets formed in the way from the bottom thereof to said height, means directing water into the way to form substantially a stream flowing from the top to the bottom thereof, and means at each pocket to maintain a body of water therein, each pocket being deep and large enough to permit fish to swim therein and leap to the next pocket up the way.

Examples of this invention are illustrated in the accompanying drawings, in which, FIGURE 1 is a reduced plan view of a dam and one form of a spiral fish ladder associated therewith, FIGURE 2 is a front elevation of the ladder looking in the direction of the dam, FIGURE 3 is a cross section through the dam and ladder taken on the line 3—3 of FIGURE 1, FIGURE 4 is a fragmentary sectional view of the upper end of the ladder, FIGURE 5 is a fragmentary cross section taken on the line 5—5 of FIGURE 4, and FIGURE 6 is a view similar to FIGURE 2, but on a smaller scale, of an alternative form of spiral fish ladder.

Referring to the drawings, 10 is a dam having a face 11 on the upstream side thereof, and a face 12 on its downstream side. A spiral fish ladder 15 is provided at this dam. The ladder may be actually formed partly or completely within the dam, or it may be located at the downstream face thereof. In the example of FIGURES 1 to 5, the ladder is formed partly within the dam.

The ladder 15 includes a spiral way 20 which winds in a comparatively gentle grade from below the surface 21 of the lower water at the foot of the dam to the top 22 of the latter. The spiral way may be supported in any convenient manner. In this example, a central vertical support 26 is provided, and the spiral way is secured to and winds around this support. It is desirable to make support 26 in the form of a tube. The outer edge of the spiral way is supported by a plurality of spaced vertical supports 28 located outside the dam 10. The portion of the spiral way within the dam may be connected to the latter, as shown, or some supports 28 may be located within the dam structure to carry said way. The way may have any desired and convenient slope, and it has been found that a rise of 6% is satisfactory.

The spiral way 20 is provided with a succession of shallow and progressively higher pockets 32 which extend from the bottom of the way to the height to which it is desired to raise the fish for the higher water behind the dam. These pockets are so formed that there is a ridge or shoulder 34 between each pocket and those above and below it. Each shoulder is a little higher than the next one below it. A spiral wall 35 is formed along the edge of the way from the top to the bottom thereof to keep water in the pockets 32. If desired, this wall may be hollow, as indicated at 36 in FIGURE 2. In this case, the wall may be provided with slots 37 at some pockets 32 spaced above the bottoms thereof, said slots bringing pockets into communication with the interior 36 of the wall.

Each pocket 32 is preferably sharply rounded at 39 at the base of the lower shoulder 34 gently sloped at 40 towards the upper shoulder, said shoulders defining the upper and lower extremeties of the pocket. Furthermore, the pocket extends from the confining wall 35 inwardly of the way to support 26, and as a result of the spiral, it diminishes in length in the longitudinal direction of the spiral from said wall to the support.

Water is directed into the spiral way 20 in any desired manner in order to form substantially a stream flowing from the top to the bottom thereof. This may be accomplished by directing a controlled flow of water into the top of the way, but it is preferable to direct water into the way at a plurality of points throughout the length of support 26. For this purpose, a plurality of outlet ports 43 are formed in tubular support 26 and open into pocket 32. It is preferable to make these outlets progressively smaller from the top to the bottom of the supports. It is also desirable to provide means for adjusting the effective size of these outlet ports. This may be done by providing a sleeve 45 rotatably fitting within tube 26 and extending the length thereof. Sleeve 45 is provided with a port 46 at each outlet 43. When each pair of ports 43—46 are in complete registry, the outlet is fully opened, and sleeve 45 may be rotated to move the ports 46 away from full registry with ports 43 to reduce the effective size of the outlets. Sleeve 45 may be rotated in any convenient manner. In this example, a ring gear 49 is provided on the upper end of the sleeve, and a pinion 50 meshes with this gear. This pinion is fixed to a vertical shaft 51 to which a handle 52 is connected, said handle extending over the top of the dam, see FIGURES 1, 3 and 4. The handle may be moved to rotate pinion 50 which, in turn, rotates sleeve 45.

As the water may emerge from ports 43 under comparatively great force, and particularly at the ports near the bottom of tube 26, it is desirable to provide a deflector 53 in the spiral way at each port, see FIGURES 4 and 5.

These deflectors are positioned in front of their respective ports and are shaped to direct the water emerging therefrom upwardly towards the underside 54 of the spiral way immediately thereabove to break the force of the water entering the spiral way pockets.

Water is supplied to tube 26 in any convenient manner. This may be done by a pump 55 located on the top of the dam which directs water from behind the dam through a pipe 56 into the upper end of a sleeve within tube 26. If desired, tube 26 may be provided with an opening 60 therein near the entrance end 61 of the spiral way 20 to allow escape of water from said tube at the bottom thereof.

The operation of this spiral fish ladder is very simple. Sufficient water is directed into the spiral way 20 to maintain a body of water in each pocket 32. This body of water must be deep and large enough to permit fish to swim in the pocket. Actually, the shoulder 34 at the lower side of each pocket acts as means for maintaining the desired depth of water therein. Although all of the necessary water may be directed into the top of the spiral way, it is preferable to direct water into said way through the outlet ports 43 throughout the length of said way. The flow of water must be sufficient to enable the fish to swim in each pocket and to leap into the pocket above it, also to encourage the fish to swim upwardly through the spiral way. However, care must be taken that the flow does not become violent or too rapid near the lower end of the spiral way. Water directed into the way through outlets 43 strike deflectors 53 which direct it upwardly against the undersurface of the way so that the force of the water is lost. If there is a tendency towards too much water in the spiral way near the lower end thereof, its level will rise to reach slots 37 in way 35 so that some of the water will run into the interior 36 of the wall to be discharged at the lower end of the way.

During use, water flowing from the lower end 61 of the spiral way and from outlet 60 of tube 26 creates a current flowing away from this fish ladder which attracts fish to the latter. As is well known, spawning salmon always swim against the current when in the streams during the spawning season.

When the fish get to the top of the spiral way, they are directed into a downwardly-inclined spillway or channel 65 at the top of the dam which directs them towards the water at the back thereof. If desired, water may be directed into this spillway by one or more pipes 66 extending from pipe 56 leading from pump 55. However, sufficient water may be directed through one of the ports 43 at the top of tube 26 for this purpose, see FIGURES 3 and 4.

FIGURE 6 diagrammatically illustrates a dam 70 having an alternative form of spiral fish ladder 71 associated therewith. This ladder is the same as the ladder 15 described above, excepting that the spiral way is located within a cylindrical casing 73 having an outlet 74 at its lower end beneath the level of the water below the dam, said level being indicated by broken lines 75. This cylindrical casing eliminates the necessity of spiral wall 35 around the edge of the way, unless it is desired to be able to remove some of the water from said way near the bottom thereof in the manner described above. The casing 73 is provided with a plurality of light openings 77 from the top to the bottom thereof. These are intended to permit light to penetrate to the interior of the ladder. These openings preferably are closed by suitable transparent material, such as glass, and they may be used as access ways to the interior of the ladder for cleaning and repair purposes. Furthermore, artificial light means may be provided at or near these openings so as to provide light within the ladder.

If it is desired to allow fingerlings to move down the ladder 15, the water behind the dam may be allowed to rise until the fingerlings can swim through spillway 65, whence they are able to find their way down the spiral way.

If desired, a suitable recorder may be positioned at spillway 65 to count the fish passing through the latter.

What I claim as my invention is:

1. A ladder for assisting fish to move from low water to higher water at dams and obstructions in streams, comprising a central tube, a sleeve rotatably mounted within said tube and extending longitudinally thereof, a spiral way winding around the tube and extending upwardly from within the low water to the height it is desired to raise fish for the higher water, said way forming a gently sloping passage to the desired height, a succession of shallow and progressively higher pockets formed in the way from the bottom thereof to said height, means for directing a controlled flow of water into said sleeve, a plurality of outlets formed in the tube at different levels to direct water into the spiral way to form a stream therein flowing from the top to the bottom thereof, a plurality of ports formed in said sleeve adjacent each of said outlets and adapted upon rotation of said sleeve relative to said tube to vary the effective size of said outlets, means for retaining the water within the way, and means at each pocket to maintain a predetermined depth of water therein, said predetermined depth of water being sufficient for fish to swim therein and to progress therefrom to the next pocket up the way.

2. A ladder for assisting fish to move from low water to higher water at dams and obstructions in streams, comprising a central tube, a sleeve rotatably mounted within said tube and extending longitudinally thereof, a spiral way winding around the tube and extending upwardly from within the low water to the height it is desired to raise fish for the higher water, said way forming a gently sloping passage to the desired height, a succession of shallow and progressively higher pockets formed in the way from the bottom thereof to said height, means for directing a controlled flow of water into said sleeve, a plurality of outlets formed in the tube at different levels to direct water in the spiral way to form a stream therein flowing from the top to the bottom thereof, said outlets being made progressively smaller from the top to the bottom of the central tube, a plurality of ports formed in said sleeve adjacent each of said outlets and adapted upon rotation of said sleeve relative to said tube to vary the effective size of said outlets, means adjacent said tube outlets against which water from said outlets impinges to break the force thereof as it enters the way, and a hollow wall formed along the outer edge of said way from the top to the bottom thereof provided with a plurality of slots opening into said pockets, said slots being located a predetermined height above the floor of the way whereby the water level in each of said pockets is maintained at said predetermined height above the floor of the way.

References Cited in the file of this patent

UNITED STATES PATENTS

| | | |
|---|---|---|
| 1,046,964 | Burkholder | Dec. 10, 1912 |
| 1,047,604 | Abernathy | Dec. 17, 1912 |
| 1,564,903 | Stephard | Dec. 8, 1925 |
| 1,718,181 | Province | June 18, 1929 |
| 2,922,282 | Dohrer | Jan. 26, 1960 |

FOREIGN PATENTS

| | | |
|---|---|---|
| 319,833 | Great Britain | Oct. 3, 1929 |